Jan. 24, 1950       L. P. HERRINGTON       2,495,414
AIR FILTER FOR ELECTRICALLY HEATED DRAPES
Filed Oct. 6, 1948       2 Sheets-Sheet 1

Inventor
Lovic Pierce Herrington.

By
Cameron, Kerkam & Sutton
ATTORNEYS

Patented Jan. 24, 1950

2,495,414

UNITED STATES PATENT OFFICE 2,495,414

AIR FILTER FOR ELECTRICALLY HEATED DRAPES

Lovic Pierce Herrington, Hamden, Conn., assignor, by mesne assignments, to Electric Heat Devices, Inc., Pittsburgh, Pa., a corporation of Pennsylvania Application October 6, 1948, Serial No. 53,073

5 Claims. (Cl. 219—46)

This invention relates to air filters for electrically heated drapes.

In my pending application, Serial No. 2,478, filed January 15, 1948, for "Heaters", now Patent No. 2,469,466, issued on May 10, 1949, I describe and claim an electrically heated drape in which electric heating elements woven into a fire resistant material are mounted within a hollow sleeve of material formed by front and back elements of fire resistant material the front element then being preferably covered by a layer of decorative material to form a window drape of conventional appearance. This drape is open at the top and bottom.

When the electric heating element is energized the heat will rise in the interior of the drape, because of its tubular shape, will cause a pronounced though moderate chimney effect. This chimney effect will cause the circulation of air upwardly through the drape and this circulation of air will entrain dust and dirt which will not only be deposited within the drape but will be deposited on walls and ceiling adjacent the open upper end of the drape. Such deposition of dust and dirt is objectionable requiring frequent cleaning of the drape and adjacent wall and ceiling surfaces. Circulation of dust and dirt within a room is also objectionable because of its effect upon the occupants of the room.

I have found that these results may be overcome by the use of a novel air filter adjacent the lower open end of the drape in such a manner that it cannot be seen but will effectively remove the dust and dirt from the air passing upward through the drape when the same is heated.

It is accordingly an object of the present invention to provide a novel filter for an electrically heated drape which will effectively remove entrained dust and dirt from air circulating upwardly through the drape when heated.

Another object of the present invention is to provide such a filter which can be readily and easily inserted and removed from the drape.

Another object is to provide such a filter which does not require modification of the drape structure for its use.

Another object is to provide such a filter which when in place cannot be seen and does not interfere with the appearance of the drape.

Another object is to provide such a filter which will take readily any shape, form or convolution of the drape.

Other and further objects of the present invention will appear from the following description thereof.

My invention is capable of various mechanical embodiments two of which are shown in the accompanying drawings and are described hereinafter for the purpose of illustrating the present invention. These embodiments should in no way be construed as defining or limiting my invention and reference should be had to the appended claims for this purpose.

In the drawings, in which like reference characters designate like parts,

Figure 1:
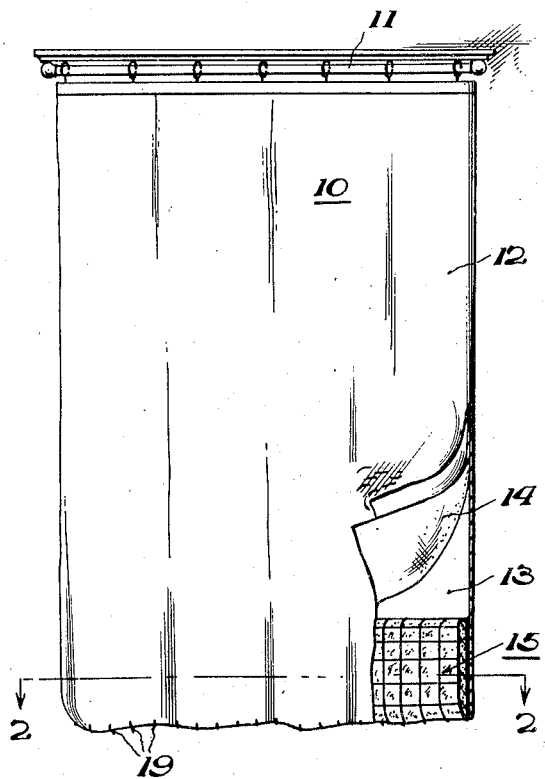
Fig. 1 is a view of an electrically heated drape with a corner thereof lifted and cut away to show a filter in position within the drape adjacent the lower open end thereof in accordance with my invention.

Referring now more particularly to Fig. 1, an electrically heated drape 10 is there shown suspended from any suitable means such as a conventional curtain rod 11. Drape 10 as shown comprises an outer decorative layer 12 of fabric suitably connected to a backing element 13 to form a flattened sleevelike open ended drape enclosing a suitable electric heating element 14. Electric heating element 14 extends substantially the entire width of the drape. It is supported at the head of the drape and extends adjacent to but stops short of the lower end of the drape. A filter element 15 is mounted within the drape adjacent its lower open end below the heater element 14 and extends from one side to the other of the drape and is secured to the front and back elements 12 and 13 of the drape to close the lower end thereof.

Filter element 15 is made of a suitable dry filter material such as cotton batting, composition paper, wool felt, fiber glass or other low density large surface filter material. Such filter material is generally indicated at 16. Filter material 16 is encased in a wire or buckram mesh 17 which has openings of suitable size to retain the filter material without hindering the flow of air therethrough.

Figure 3:
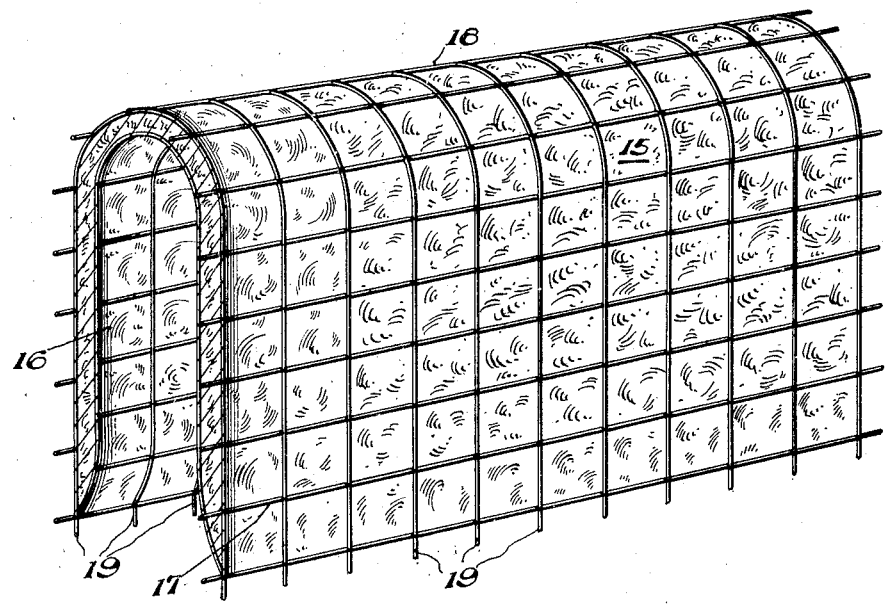
Fig. 3 is a view of an embodiment of a suitable filter element of my invention.

The embodiment of the filter element 15 of Fig. 3 is formed in a large relatively thin sheet encased in mesh 17 and folded over along the line 18 to form a double thickness. The ends 19 of mesh 17 are allowed to extend from the body of the filter to form pinlike elements. The filter of the embodiment of Fig. 3 is inserted into the drape with fold 18 upward so that pin elements 19 extend downwardly. When the filter element is completely enclosed within the drape pin elements 19 are engaged in the cloth of the front and back elements 12 and 13 to hold the filter in place. If pin elements 19 pass completely through the cloth of the drape they may be turned over into the cloth and thus concealed.

As noted above, filter element 15 is of sufficient length to extend from one side to the other of the drape and thus completely closes the open lower end of the drape. Air passing upward through the drape must first pass through the filter material 16 and the dust and dirt entrained in the air is removed before the air passes upwardly through the drape.

Figure 4:
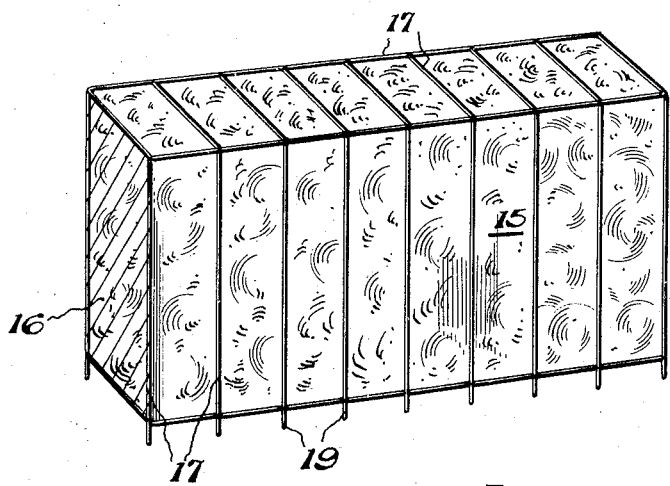
Fig. 4 is a view of another embodiment of a suitable filter element of my invention.

In the embodiment of the filter 15 of Fig. 4 the filter 15 is made in a more or less rectangular shape, the filter material 16 again being enclosed in a suitable mesh of wire or buckram 17 having extending pinlike ends 19 to hold the element in place within the drape. This embodiment provides a thicker body of filter material 16 through which the air must pass and thus provides a filter element suitable for larger volumes of air or for use over extended periods of time without cleaning.

The type of filter element shown and described with respect to Fig. 3 has been found particularly suitable for use with relatively short drapes of the lengths usually employed in homes while the filter element shown and described with respect to Fig. 4 is particularly useful for relatively long drapes such as those found in auditoriums, churches and other structures having long windows.

Figure 2:
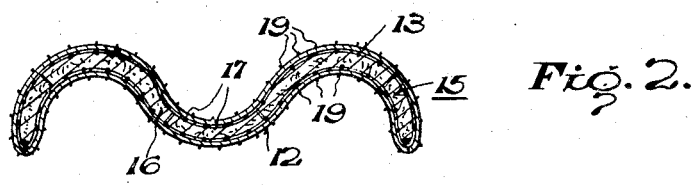
Fig. 2 is a cross sectional view of the embodiment of Fig. 1 on the line 2—2 thereof.

Since filter material 16 and mesh 17 are quite flexible filter elements 15 may be easily and readily formed to take the shape of the drape and may be bent or folded into folds or convolutions desired for the hanging drape. The cross sectional view of Fig. 1 seen in Fig. 2 shows how filter element 15 may be formed or bent to take any shape desired for the drape. In this view pin elements 19 are shown as extending through the front and back drape elements 12 and 13 and as noted above pin elements 19 may be bent downwardly after passing through the elements of the drape so that they are concealed by the material of such drape elements.

It will now be apparent that by the present invention I have provided a novel filter for electrically heated drapes which is arranged within and adjacent the open lower end thereof to filter entrained dust and dirt from air passing upwardly through the electrically heated drape; that effectively removes dust and dirt from such air preventing deposition thereof within the drape and on adjacent wall and ceiling surfaces; that may be readily and easily removed and inserted within the drape; and which is easily formed into any desired shape to take the convolutions or folds of the hanging drape.

Changes to or modifications of the above described illustrative embodiments of my invention may now be suggested to those skilled in the art without departing from my inventive concept. To determine the scope of the present invention reference should be had to the appended claims.

What is claimed is:

1. In a window drape, front and rear drape elements joined along their long sides and supported above and adjacent to the window, an electric heating element enclosed and supported within said drape elements, and a filter element closing the open lower end of the window drape.

2. The combination as defined in claim 1 in which the filter element comprises filter material enclosed in a flexible mesh.

3. The combination as defined in claim 1 in which the filter element comprises filter material enclosed in a flexible mesh the ends of which extend beyond the filter material forming pinlike elements engageable with the material of the front and rear window drape elements to hold the filter element in position.

4. The combination as described in claim 1 in which the filter element comprises a relatively thin sheet of filter material enclosed by a mesh and folded along the length thereof for insertion between the front and rear window drape elements with the fold upwards, the mesh extending beyond the filter material to form pinlike elements engageable with the front and rear drape elements to hold the filter element in position within the window drape elements to close the open lower end of the window drape.

5. The combination as described in claim 1 in which the filter element comprises a generally rectangular body of filter material encased in a flexible mesh, the ends of the mesh extending beyond the body of the filter material to form pinlike elements engageable with the front and rear window drape elements when the filter is inserted within the open lower end thereof to hold the filter in poistion within the window drape closing the open lower end of the window drape.

LOVIC PIERCE HERRINGTON.

REFERENCES CITED

The following references are of record in the file of this patent:

UNITED STATES PATENTS

| Number | Name | Date |
|---|---|---|
| 1,841,347 | Tuttle | Jan. 12, 1932 |
| 2,132,263 | Hambleton | Oct. 4, 1938 |
| 2,138,736 | Gaardner | Nov. 29, 1938 |
| 2,165,970 | Jaspers | July 11, 1939 |
| 2,274,840 | Marick et al. | Mar. 3, 1942 |
| 2,379,580 | Hendley | July 3, 1945 |

OTHER REFERENCES

Ser. No. 317,610, Mossin (A. P. C.) pub. May 25, 1943.